US012134998B1

(12) United States Patent
Chenoweth et al.

(10) Patent No.: US 12,134,998 B1
(45) Date of Patent: Nov. 5, 2024

(54) RESERVE FUEL SYSTEM FOR WELLSITE EQUIPMENT

(71) Applicant: Halliburton Energy Services, Inc., Houston, TX (US)

(72) Inventors: Brenden Chenoweth, Norman, OK (US); Timothy Holiman Hunter, Duncan, OK (US); Christopher Ryan Almon, Duncan, OK (US); Austin Carl Schaffner, Bixby, OK (US); Billy D. Coskrey, Duncan, OK (US); Adam Lynn Marks, Duncan, OK (US); Andrew Silas Clyburn, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/234,509

(22) Filed: Aug. 16, 2023

(51) Int. Cl.
*F02M 21/00* (2006.01)
*F02M 21/02* (2006.01)

(52) U.S. Cl.
CPC .... *F02M 21/0224* (2013.01); *F02M 21/0236* (2013.01)

(58) Field of Classification Search
CPC .................................................. F02M 21/0224
See application file for complete search history.

(56) References Cited

U.S. PATENT DOCUMENTS 3,710,809 A 1/1973 Gerfen et al.
3,754,569 A 8/1973 Fallotico
4,846,134 A * 7/1989 Perry ................. F02M 21/0221 123/518
5,101,799 A * 4/1992 Davis ................. F02M 21/0215 123/527
5,632,250 A * 5/1997 Kato ..................... F02D 19/025 123/198 DB
5,735,248 A * 4/1998 Matsuura ............. F02D 19/024 123/527
6,102,065 A * 8/2000 Tobias ................... B60K 15/06 137/263
6,439,334 B1 * 8/2002 Myers ................ F02M 21/0233 180/69.5
6,446,616 B1 * 9/2002 Kabat .................... F02M 37/20 123/527
7,367,312 B1 * 5/2008 Boyer .................. F02D 19/024 123/304

(Continued)

*Primary Examiner* — Phutthiwat Wongwian
*Assistant Examiner* — Sherman D Manley
(74) *Attorney, Agent, or Firm* — Kilpatrick Townsend & Stockton LLP

(57) ABSTRACT

A reserve fuel system can be used to supplement fuel provided to an engine of wellsite equipment. For example, a fuel supply line can transport gaseous fuel at a wellsite to an engine of an equipment coupled to the fuel supply line. A reserve fuel tank can store gaseous fuel diverted from the fuel supply line. The reserve fuel tank can include a first valve coupling a first end of the reserve fuel tank to the fuel supply line to divert the gaseous fuel and a second valve coupling a second end of the reserve fuel tank to the engine. The second valve can be in a closed position to prevent the stored gaseous fuel from transferring to the engine or an open position to transfer the stored gaseous fuel to the engine. A control system can adjust the second valve based on a pressure of the fuel supply line.

17 Claims, 9 Drawing Sheets

(56) References Cited

U.S. PATENT DOCUMENTS

| | | | | |
|---|---|---|---|---|
| 9,903,534 | B2 | 2/2018 | Gustafson et al. | |
| 9,951,905 | B2 * | 4/2018 | Barker | F17C 9/00 |
| 11,247,747 | B1 | 2/2022 | Chen | |
| 11,313,213 | B2 | 4/2022 | Yeung et al. | |
| 2008/0099002 | A1 * | 5/2008 | Boyer | F02D 41/0027<br>123/527 |
| 2010/0276027 | A1 * | 11/2010 | Pucher | F02D 19/027<br>141/1 |
| 2011/0088655 | A1 * | 4/2011 | Ancimer | F02D 41/0027<br>123/299 |
| 2011/0088811 | A1 * | 4/2011 | Shudo | F02M 21/0236<br>141/248 |
| 2014/0174404 | A1 * | 6/2014 | Coldren | F02D 19/0673<br>123/459 |
| 2016/0245244 | A1 * | 8/2016 | Katsura | F02M 21/0212 |
| 2017/0108170 | A1 | 4/2017 | Gustafson | |
| 2021/0094410 | A1 * | 4/2021 | Conte | F02M 21/023 |
| 2021/0372350 | A1 * | 12/2021 | Seba | F02M 21/0218 |
| 2022/0072948 | A1 | 3/2022 | Conte et al. | |
| 2022/0193629 | A1 * | 6/2022 | Kambara | F02D 19/0671 |
| 2022/0242224 | A1 * | 8/2022 | Jaussaud | B62D 33/06 |
| 2022/0243673 | A1 * | 8/2022 | Khosravi | F02D 19/022 |
| 2022/0250467 | A1 * | 8/2022 | Shroff | F02M 21/0224 |
| 2022/0298745 | A1 * | 9/2022 | Kunizawa | F02B 43/00 |

* cited by examiner

RESERVE FUEL SYSTEM FOR WELLSITE EQUIPMENT

TECHNICAL FIELD

The present disclosure relates generally to wellsite fuel systems and, more particularly (although not necessarily exclusively), to a reserve fuel system for wellsite equipment.

BACKGROUND

Performing operations, such as drilling or completion operations, at a wellsite entails various steps, each using a number of wellsite equipment. For instance, at the wellsite, there may be various fracturing equipment on location that require power. Often, each wellsite equipment can be powered by an engine consuming gaseous fuel. The various wellsite equipment may rely on diesel engines or dual-fuel engines that consume a mixed fuel containing natural gas and diesel for power. The various wellsite equipment can be damaged or fail when the gaseous fuel flowing to the engines from a fuel source, such as from a fuel tank or hydrocarbon-producing wellbore, varies in quality, pressure, flow rate, or other characteristics. Equipment failure can lead to a loss of well control or other hazards.

DETAILED DESCRIPTION

Figure 1:
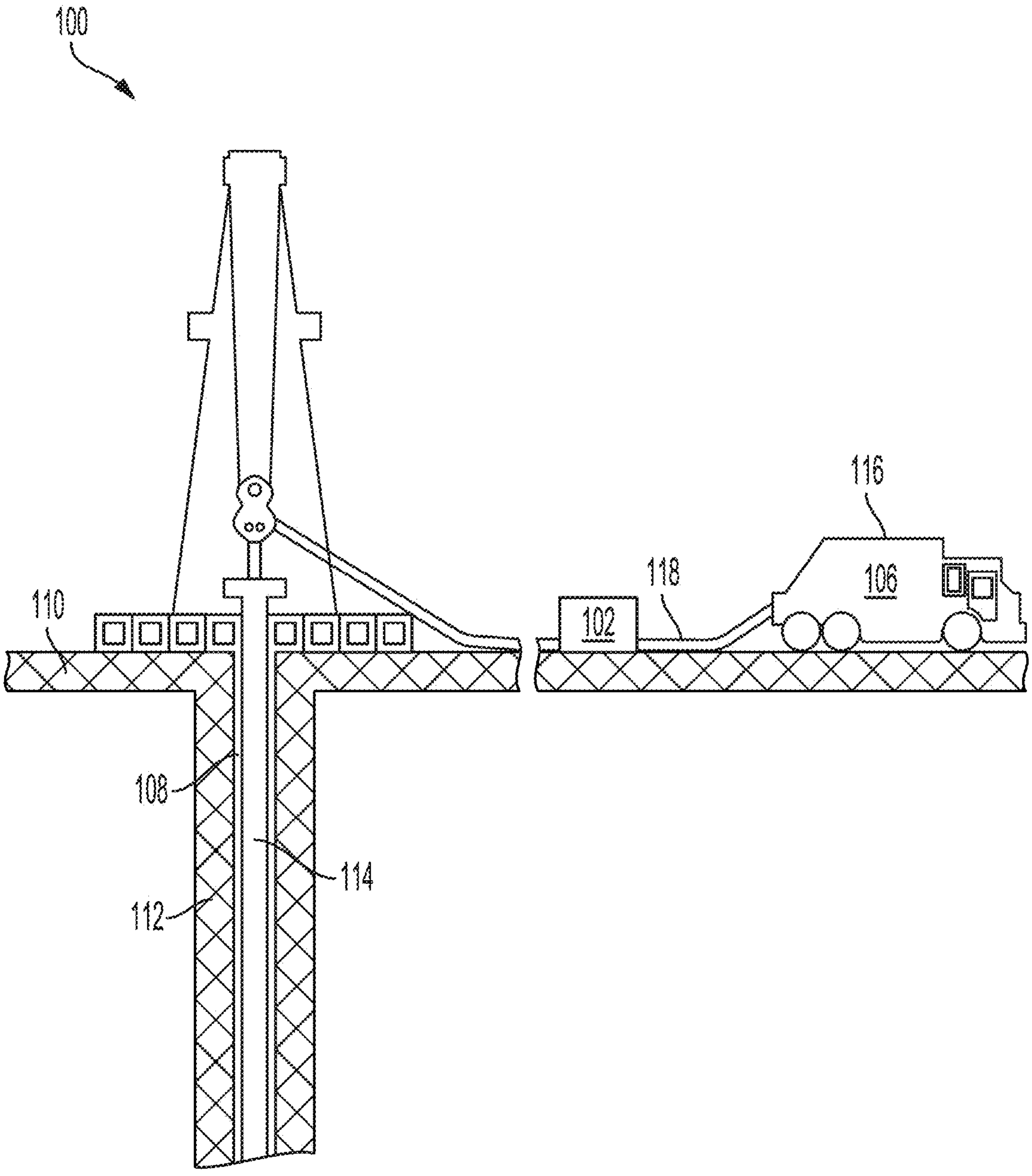
FIG. 1 is a schematic of a wellsite that includes a reserve fuel system for an engine according to one example of the present disclosure.

Certain aspects and examples of the present disclosure relate to a reserve fuel system that can supplement gaseous fuel such as natural gas provided to an engine at a wellsite. The engine can be used to power equipment that can perform wellsite operations (e.g., drilling operations, completion operations, hydraulic fracturing operations, etc.). For example, if the wellsite is a hydraulic fracturing operation, the equipment can include hydraulic fracturing trucks and cementing equipment. The engine can be supplied with gaseous fuel produced at the wellsite (e.g., from a wellbore). The reserve fuel system can store a portion of the produced gaseous fuel in a tank. As production of the natural gas may vary over time, the reserved gaseous fuel in the tank can be supplied to the engine to maintain consistent fuel supply. The reserve fuel system can be plumbed in parallel with a main fuel supply line for the engine using valves to control input and output of fuel for the tank. For example, when gaseous fuel is first connected to the fuel supply line to the engine, a first valve for the tank can allow gaseous fuel to fill the tank until pressure in the tank equalizes with the supply pressure. As the gaseous fuel supply fluctuates, a control system for the reserve fuel system can cause a second valve for the tank to open and close as needed to supplement the engine with stored fuel to maintain fuel requirements.

Inconsistent fuel supply from onsite fuel suppliers can cause engine derates or system shutdowns during wellbore operations. These inconsistencies can include quality and energy of the fuel supply, as well as fluctuations in pressure and flow of the fuel supply. In some cases, the engine derates or system shutdowns may be caused by a lack of energy in the fuel for meeting horsepower requirements for operations. Engine derates or system shutdowns can also be caused by fluctuations in fuel pressure or flow that can cause engines to starve for fuel. Spikes in pressure or flow of the fuel supply may trip high fuel pressure limits, causing engine controls to interrupt fuel supply and shut down or derate the engine. The reserve fuel system described herein can store a reserve fuel capacity that can accommodate fluctuations in fuel supply, allowing wellsite equipment to stay online and functioning without derates or shutdowns. This can increase efficiency of wellsite operations, reduce downtime, and increase lifetime of wellsite equipment.

Additionally, traditional systems may face challenges in operating wellsite engines without being connected to a fuel provider. The fuel for the wellsite equipment can be provided as needed by an onsite fuel provider. When the wellsite equipment is not connected to the fuel supplier, the operator may be unable to start or operate the unit. The reserve fuel system described herein can store gaseous fuel that can enable an operator to start or operate the wellsite equipment for a limited amount of time. For example, the operator may start or operate the unit for a short period of time for testing purposes even if the wellsite is no longer producing gaseous fuel. Further, conventional wellsite equipment may be fueled with multiple gas sources, such as both natural gas and diesel fuel. When a main supply of natural gas is interrupted or diminished, a backup diesel fuel supply may be used until natural gas can be restored. But in some examples, well equipment that is fueled solely by a single kind of gaseous fuel (e.g., natural gas) may not be supplemented with other types of fuel. Embodiments described herein can allow for more cost effective and consistent gas supply without having to pause operations until a separate trailer of gas can be delivered to the wellsite.

In an example, a reserve fuel tank can be mounted on each unit (e.g., wellsite equipment) to help offset fluctuations in fuel quality, energy, pressure, flow, or other suitable fuel characteristics. This reserve fuel tank can be plumbed in parallel with a fuel supply line between a fuel supply connection of the unit and the engine fuel inlet. The reserve fuel tank can be installed with a check valve that can allow the tank to fill when connected to the fuel supply line but can also cause fuel to be retained once inside the tank. An actuator valve downstream from the tank (e.g., installed on another side of the tank, or between the tank and the engine) can be actuated by a control system to temporarily provide reserve fuel to the engine. The control system can monitor the fuel supply line to detect low pressure or flow of gaseous fuel. When the control system detects a need for reserve fuel for the engine, the control system can actuate the actuator valve to allow the reserved gaseous fuel to be supplied to the engine. This reserved gaseous fuel can allow the engine to operate until the main fuel supply line has been recovered or stabilized. In some examples, the reserve fuel tank can be mounted to a trailer or skid that can provide reserve fuel for multiple units in the event of a fluctuation in fuel quality, energy, pressure, flow, or other suitable fuel characteristics.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a wellsite 100 that includes a reserve fuel system 102 for an engine 106 according to one example of the present disclosure. The wellsite 100 can include a wellbore 108 extending from a surface 110 of the wellsite 100 through various earth strata. The strata can include different materials (e.g., rock, soil, oil, water, or gas) and can vary in thickness and shape. For example, the wellbore 108 may extend through a subterranean formation 112 bearing natural gas or suitable gaseous fuel. In some examples, the wellsite 100 may include more than one wellbore 108.

A tubing string 114 can extend from the surface 110 into the wellbore 108. The tubing string 114 can provide a conduit for gaseous fuel extracted from the subterranean formation 112 to travel from the subterranean formation 112 to the surface 110. The gaseous fuel can be transported through the tubing string 114 to the surface 110 such that one or more equipment 116 that have a gas-consuming engine 106 can be powered using the gaseous fuel. The equipment 116 may be equipment used during wellbore operations (e.g., drilling operations, fracking operations, or completion operations). In some examples, the gaseous fuel can flow directly from the subterranean formation 112 to the equipment 116 such that the equipment 116 can operate at least in part using the gaseous fuel from the wellbore 108.

Additionally or alternatively, the gaseous fuel can flow from the subterranean formation 112 to the surface 110 and be processed or collected prior to being used as fuel for the equipment 116. In some cases, the gaseous fuel may be stored in a tank or another suitable storage container prior to being used as fuel for the equipment 116. If the gaseous fuel is natural gas, the natural gas may be processed prior to storage to ease transport. For example, the natural gas may be compressed to form compressed natural gas (CNG) or cooled to form liquefied natural gas (LNG). Other examples of gaseous fuel supplied to the equipment 116 can include produced hydrogen, pipeline gas, transported hydrogen, hydrogen generated on site, blended fuels, or any other type of suitable gaseous fuel.

As another example, the gaseous fuel extracted from the subterranean formation 112 may flow to gas conditioning equipment positioned at the surface 110. The gas conditioning equipment can remove liquids present in the natural gas to avoid engine damage of the equipment 116. In some examples, a reserve fuel system 102 can be positioned in-line with a flow path 118 between the gas conditioning equipment and the equipment 116 having a gas-consuming engine 106. The reserve fuel system 102 may be mounted onto the equipment 116 (e.g., on a same trailer or skid as the equipment 116) or separate from the equipment 116. The reserve fuel system 102 can be plumbed in parallel with the fuel supply going to the engine 106 to fill a tank with reserved fuel. The reserved fuel can be retained in the tank until a control system in the reserve fuel system 102 detects pressure variations in the flow path 118.

Figure 2:
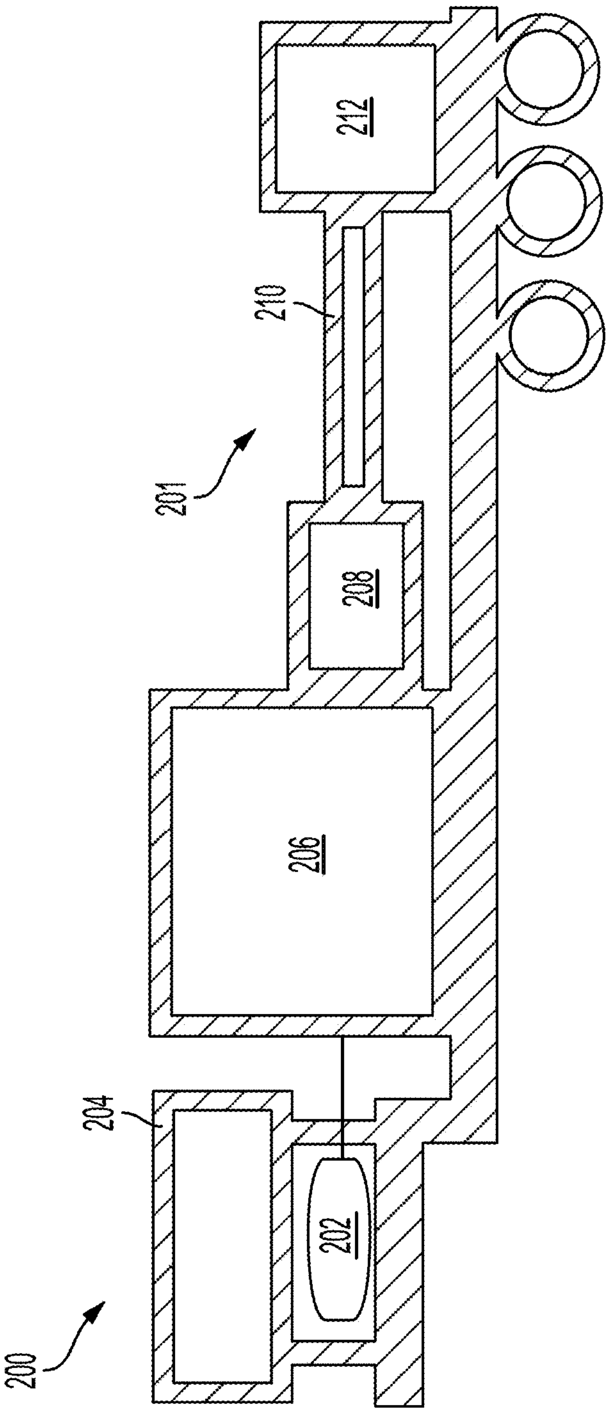
FIG. 2 is a block diagram of a fuel skid including a reserve fuel system and wellsite equipment according to one example of the present disclosure.

FIG. 2 is a block diagram of a fuel skid 200 including a reserve fuel tank 202 and wellsite equipment 201 according to one example of the present disclosure. As depicted in FIG. 2, the reserve fuel tank 202 can be positioned on a same fuel skid 200 or trailer as the equipment 201. In other examples, the reserve fuel tank 202 may not be positioned on the same fuel skid 200 but may be positioned at the wellsite. The reserve fuel tank 202 can be coupled to an engine 206 of the equipment 201 to supply reserve fuel to the engine 206. The equipment 201 can further include a transmission 208 coupled to the engine 206, a drive shaft 210 driven by the transmission 208, and a driven device 212 driven by the drive shaft 210. In some examples, the driven device 212 may be a fracturing pump, a generator, a gas compressor, an excavator, a mine hauler, or any other type of offroad mobile equipment used at a wellsite that uses an engine. The engine 206 and the reserve fuel tank 202 can be connected to a fuel supply line that supplies gaseous fuel such as natural gas from a wellbore or other gas sources. The engine may be a diesel engine, a duel-fuel engine, a spark-ignited gas engine, or any other suitable gaseous fueled engine.

Figure 3:
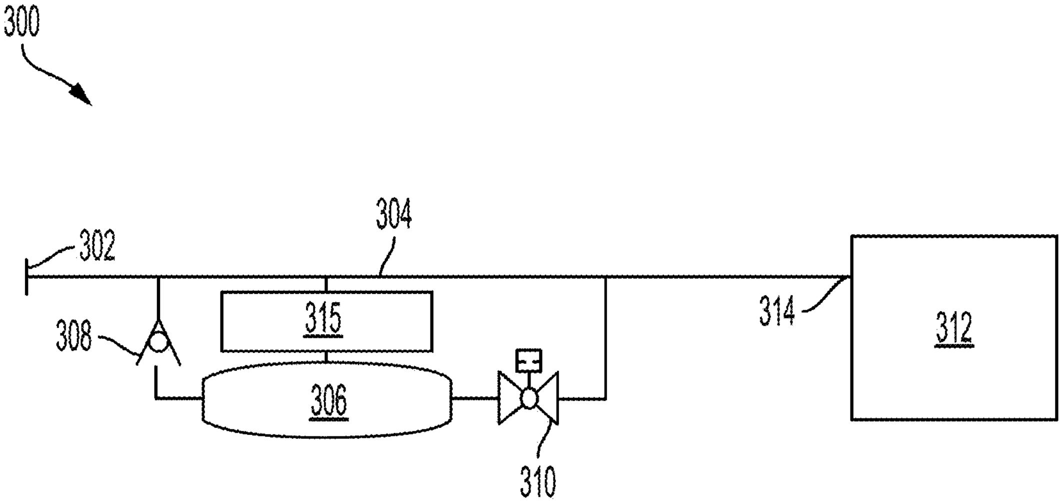
FIG. 3 is a block diagram of a reserve fuel system for wellsite equipment according to one example of the present disclosure.

FIG. 3 is a block diagram of a reserve fuel system 300 for wellsite equipment according to one example of the present disclosure. In some examples, a reserve fuel system 300 may be mounted on each unit at a wellsite as an on-board reserve. The reserve fuel system 300 can include a fuel supply inlet 302 that receives gaseous fuel from a wellbore (e.g., the wellbore 108 of FIG. 1) or other suitable sources. The gaseous fuel can be supplied to an engine 312 via a fuel supply line 304 connected to an engine fuel inlet 314 for the engine 312.

The reserve fuel system 300 can also include a control system 315 and a tank 306 that can be plumbed in parallel with the fuel supply going to the engine 312. The tank 306 can include or be coupled to a first valve 308 controlling gaseous fuel flow into the tank 306 and a second valve 310 controlling gaseous fuel flow out of the tank 306. In some examples, the first valve 308 may be a check valve or any other type of valve that can allow the tank 306 to fill when connected to the fuel supply line 304 and prevent gaseous fuel from exiting the tank 306 via the first valve 308. When gaseous fuel is supplied to the fuel supply inlet 302, gaseous fuel diverted from the fuel supply line 304 can fill the tank 306 until pressure inside the tank 306 equalizes with supply pressure of the gaseous fuel. The first valve 308 may couple a first end of the tank 306 to the fuel supply line 304 upstream from the engine 312.

In some examples, the second valve 310 may be an actuator valve or any other type of valve that can be actuated to control a flow of gaseous fuel out of the tank 306. The second valve 310 may couple a second end (e.g., opposite the first end) of the tank 306 to the engine 312 or to the fuel supply line 304 downstream from the first valve 308. The second valve 310 can be actuated between positions to control gaseous fuel flow out of the tank 306. For example, the second valve 310 can be positioned in a closed position to prevent gaseous fuel stored in the tank 306 from transferring to the engine 312. The second valve 310 can also be positioned in an open position that can allow gaseous fuel stored into the tank 306 to flow out of the tank 306 and transfer to the engine 312. The actuation of the second valve 310 can be controlled by a control system 315.

The control system 315 can monitor pressure in the fuel supply line 304. In some examples, the control system 315 may also monitor pressure inside the tank 306 as well as other fuel characteristics, such as flow rate, fuel quality, and energy of the gaseous fuel in the fuel supply line 304 or tank 306. The control system 315 can actuate the second valve 310 based on these detected characteristics. For example, the tank 306 may store gaseous fuel diverted from the fuel supply line 304 and the second valve 310 may be in a closed position. The control system 315 may then detect that a pressure of the fuel supply line 304 is lower than a predetermined threshold. This may indicate that the supply of gaseous fuel is no longer sufficient to power the engine 312. To supplement the diminished gaseous fuel supplied from the fuel supply inlet 302, the control system 315 can actuate the second valve 310 from the closed position to the open position. The gaseous fuel stored in the tank 306 can then be transferred from the tank 306 to the engine fuel inlet 314. The stored gaseous fuel can be supplied to the engine 312 until the tank 306 is empty or until the control system 315 detects that the pressure of the fuel supply line 304 is exceeding the predetermined threshold. At that point, the control system 315 may actuate the second valve 310 from the closed position to the open position to prevent stored gaseous fuel from transferring out of the tank 306. Thus, the control system 315 can automatically control the flow of gaseous fuel to maintain fuel requirements for the engine 312.

If the engine 312 or the fuel supply line 304 is no longer supplied with gaseous fuel from a real-time fuel supply, the control system 315 can actuate the second valve 310 to the open position. This can allow the stored gaseous fuel in the tank 306 to be supplied to the engine 312 for a short period of time (e.g., until all the stored gaseous fuel from the tank 306 is transferred to the engine 312). Thus, the engine 312 can be started or operated for the short period of time, such as for testing purposes.

Figure 4:
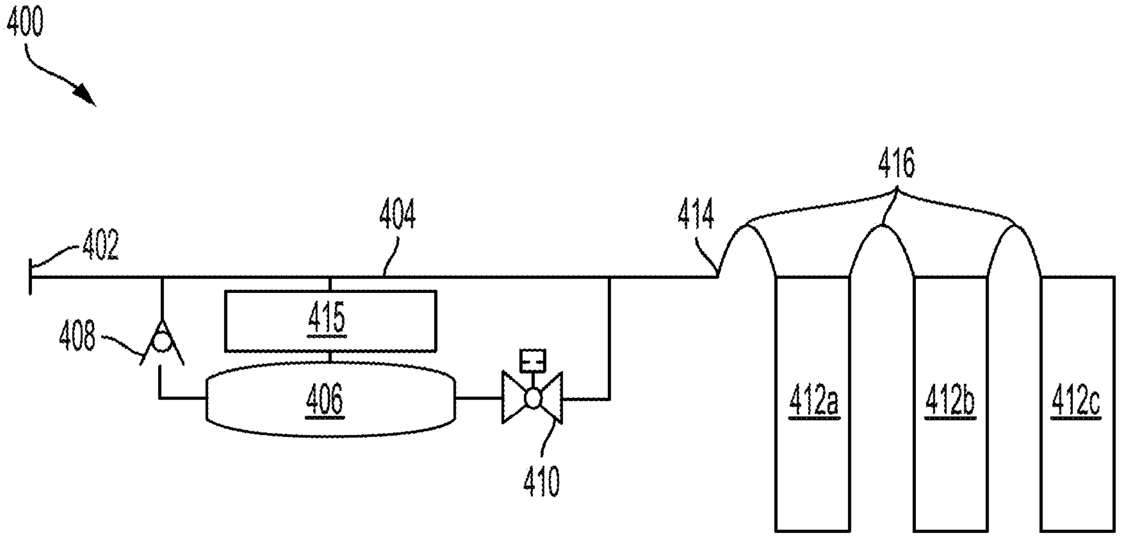
FIG. 4 is a block diagram of a reserve fuel system for multiple wellsite equipment according to one example of the present disclosure.

In some examples, the reserve fuel system 300 may supply fuel to multiple units at the same location, rather than being installed onto an individual unit. Such an example is depicted in FIG. 4, which is a block diagram of a reserve fuel system 400 for multiple wellsite equipment according to one example of the present disclosure. Like the reserve fuel system 300 of FIG. 3, the reserve fuel system 400 may include a fuel supply inlet 402 supplying gaseous fuel to an engine fuel inlet 414 via a fuel supply line 404 as well as to a tank 406. The tank 406 can be coupled to the fuel supply line 404 via a first valve 408 that can control gaseous fuel flow into the tank 406. The tank 406 can also be coupled to the fuel supply line 404 or to the engine fuel inlet 414 by a second valve 410 that can control gaseous fuel flow out of the tank 406. The reserve fuel system 400 further includes a control system 415 that can control an actuation of the second valve 410.

The reserve fuel system 400 may include a relatively large (e.g., larger than the tank 306 for a single engine 312 depicted in FIG. 3) tank 406 mounted to a trailer or skid. The tank 406 can provide reserve fuel for multiple engines 412*a-c* in the event of fluctuations in gaseous fuel pressure, flow, fuel quality, or energy. The tank 406 may be plumbed in parallel with the fuel supply line 404 supplying gaseous fuel to the multiple engines 412*a-c* at a wellsite. The engines 412*a-c* may be arranged in a fuel daisy chain 416, as depicted in FIG. 4. In other examples, the engines 412*a-c* may be arranged at a distribution station at the wellsite that connects multiple units. In either example, the control system 415 may actuate the second valve 410 for the tank 406 based on detected pressure of the fuel supply line 404 to supply the multiple engines 412*a-c* with reserved gaseous fuel.

Figure 5:
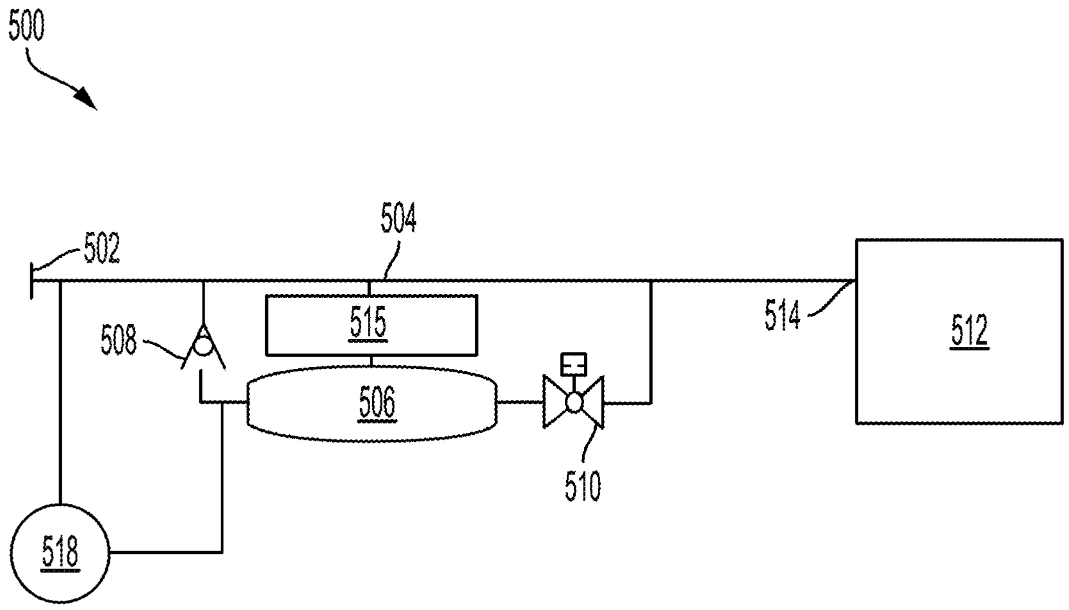
FIG. 5 is a block diagram of a reserve fuel system including a compressor for wellsite equipment according to one example of the present disclosure.

FIG. 5 is a block diagram of a reserve fuel system 500 including a compressor 518 for wellsite equipment according to one example of the present disclosure. In some examples, a reserve fuel system 500 may be mounted on each unit at a wellsite as an on-board reserve. The reserve fuel system 500 can include a fuel supply inlet 502 that receives gaseous fuel from a wellbore (e.g., the wellbore 108 of FIG. 1). The gaseous fuel can be supplied to an engine 512 via a fuel supply line 504 connected to an engine fuel inlet 514 for the engine 512. Like the reserve fuel system 300 of FIG. 3, the reserve fuel system 500 can include a control system 515 and a tank 506 that can be plumbed in parallel with the fuel supply going to the engine 512. The tank 506 can include or be coupled to a first valve 508 controlling gaseous fuel flow into the tank 506 and a second valve 510 controlling gaseous fuel flow out of the tank 506. The control system 515 can control an actuation of the second valve 510 based on a pressure of the fuel supply line 504.

The reserve fuel system 500 can further include a compressor 518 that can additionally be plumbed in parallel with the fuel supply going to the engine 512. The compressor 518 can be coupled to a first end (e.g., an upstream end) of the tank 506. The compressor 518 can compress gaseous fuel received from the fuel supply line 504 to apply increased pressure to the tank 506. This increased pressure may aid transfer of gaseous fuel out of the tank 506 to the engine 512. In some examples, the control system 515 may cause the compressor 518 to compress the gaseous fuel. For example, the second valve 510 may be positioned in an open position. The control system 515 may detect that a pressure inside the tank 506 is below a predetermined threshold. In response, the control system 515 can then cause the compressor 518 to compress gaseous fuel to increase a pressure inside of the tank 506.

Figure 6:
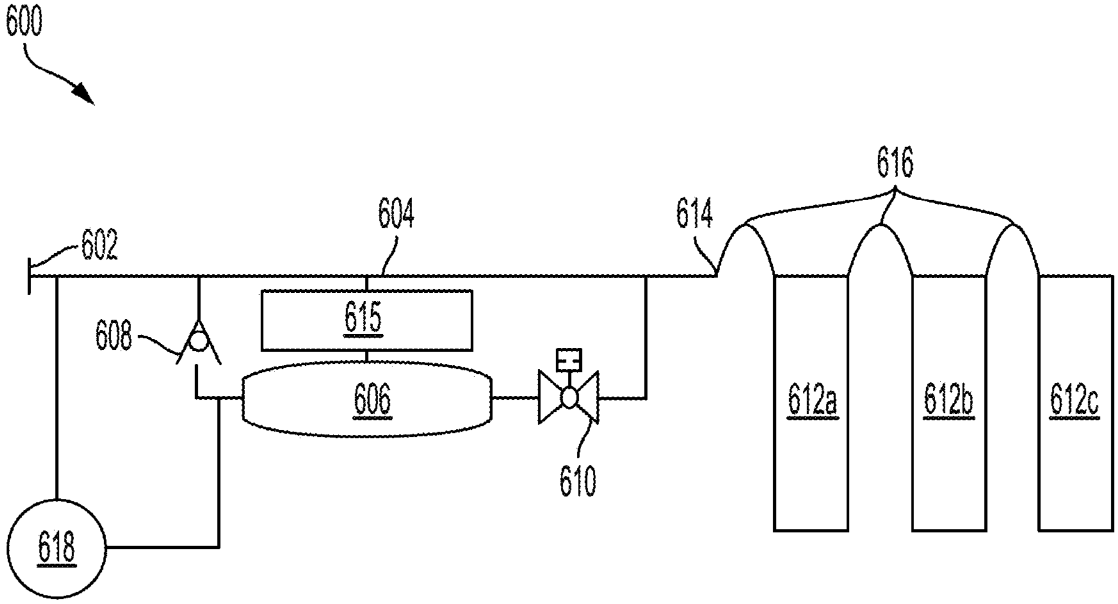
FIG. 6 is a block diagram of a reserve fuel system including a compressor for multiple wellsite equipment according to one example of the present disclosure.

In some examples, the reserve fuel system 500 may supply fuel to multiple units at the same location, rather than being installed onto an individual unit. Such an example is depicted in FIG. 6, which is a block diagram of a reserve fuel system 600 including a compressor 618 for multiple wellsite equipment according to one example of the present disclosure. Like the reserve fuel system 500 of FIG. 5, the reserve fuel system 600 may include a fuel supply inlet 602 supplying gaseous fuel to an engine fuel inlet 614 via a fuel supply line 604 as well as to a tank 606. The tank 606 can be coupled to the fuel supply line 604 via a first valve 608 that can control gaseous fuel flow into the tank 606. The tank 606 can also be coupled to the fuel supply line 604 or to the engine fuel inlet 614 by a second valve 610 that can control gaseous fuel flow out of the tank 606. The reserve fuel system 600 further includes a control system 615 that can control an actuation of the second valve 610 and a compressor 618. The compressor 618 can be plumbed in parallel with the fuel supply line 604 and can compress gaseous fuel to increase a pressure inside the tank 606.

The reserve fuel system 600 may include a relatively large (e.g., larger than the tank 506 for a single engine 512 depicted in FIG. 5) tank 606 mounted to a trailer or skid. The tank 606 can provide reserve fuel for multiple engines 612*a-c* in the event of fluctuations in gaseous fuel pressure, flow, fuel quality, or energy. The tank 606 may be plumbed in parallel with the fuel supply line 604 supplying gaseous fuel to the multiple engines 612*a-c* at a wellsite. The engines 612*a-c* may be arranged in a fuel daisy chain 616, as depicted in FIG. 6. In other examples, the engines 612*a-c* may be arranged at a distribution station at the wellsite that connects multiple units. In either example, the control system 615 may actuate the second valve 610 for the tank 606 based on detected pressure of the fuel supply line 604 to supply the multiple engines 612*a-c* with reserved gaseous fuel.

Figure 7:
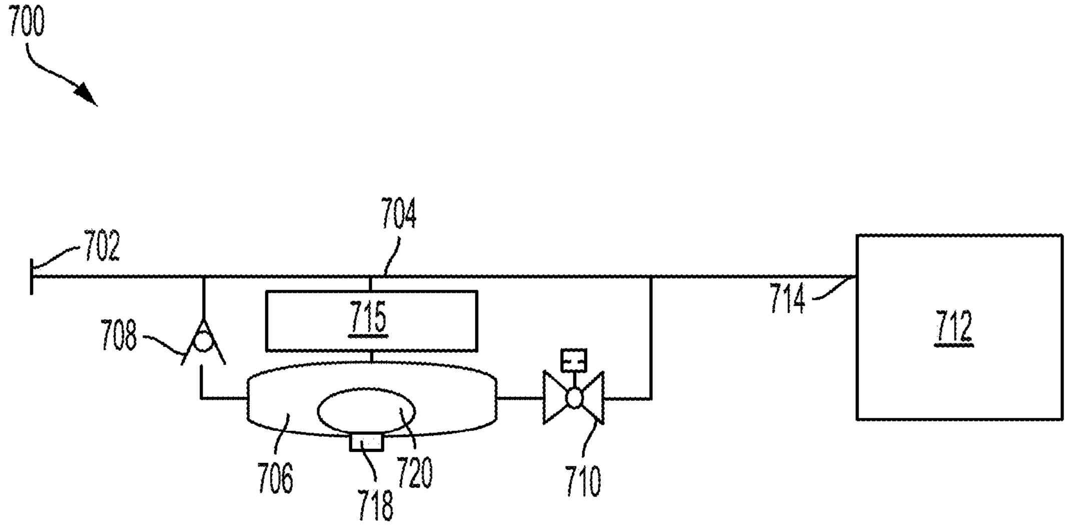
FIG. 7 is a block diagram of a reserve fuel system including a bladder for wellsite equipment according to one example of the present disclosure.

FIG. 7 is a block diagram of a reserve fuel system 700 including a bladder 720 for wellsite equipment according to one example of the present disclosure. In some examples, a reserve fuel system 700 may be mounted on each unit at a wellsite as an on-board reserve. The reserve fuel system 700 can include a fuel supply inlet 702 that receives gaseous fuel from a wellbore (e.g., the wellbore 108 of FIG. 1). The gaseous fuel can be supplied to an engine 712 via a fuel supply line 704 connected to an engine fuel inlet 714 for the engine 712. Like the reserve fuel system 300 of FIG. 3, the reserve fuel system 700 can include a control system 715 and a tank 706 that can be plumbed in parallel with the fuel supply going to the engine 712. The tank 706 can include or be coupled to a first valve 708 controlling gaseous fuel flow into the tank 706 and a second valve 710 controlling gaseous fuel flow out of the tank 706. The control system 715 can control an actuation of the second valve 710 based on a pressure of the fuel supply line 704.

The reserve fuel system 700 can further include a bladder 720 inside of the tank 706. The bladder 720 may expand in volume to increase a pressure inside of the tank 706. This increased pressure may aid transfer of gaseous fuel out of the tank 706 to the engine 712. For example, a compressor 718 on the outside the tank 706 may cause the bladder 720 to expand. In another example, external air may be pumped in from outside of the tank 706 to increase a volume of the bladder 720. In some examples, the control system 715 can control an expansion of the bladder 720.

Figure 8:
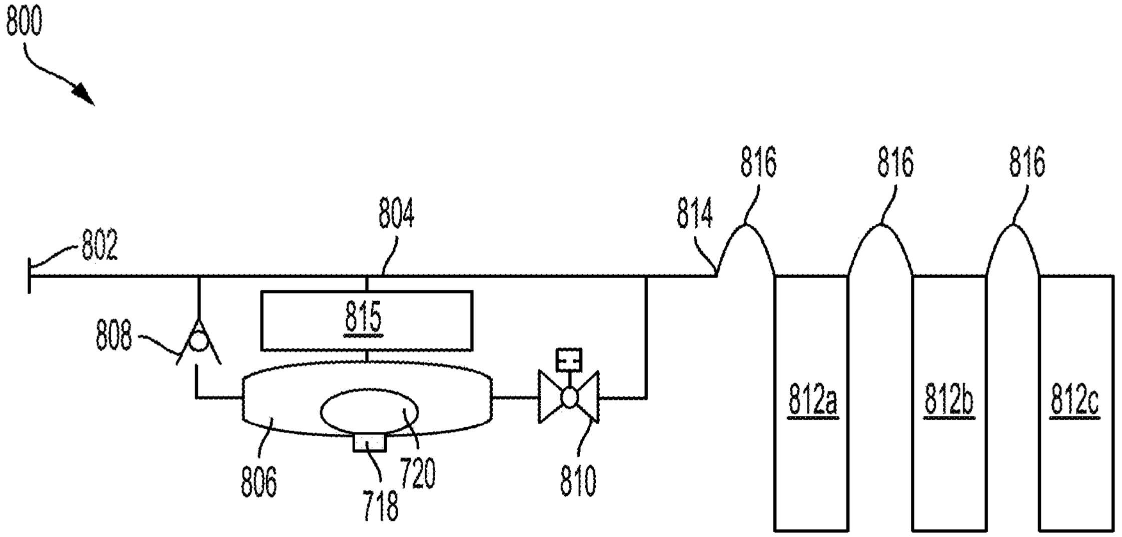
FIG. 8 is a block diagram of a reserve fuel system including a bladder for multiple wellsite equipment according to one example of the present disclosure.

In some examples, the reserve fuel system 700 may supply fuel to multiple units at the same location, rather than being installed onto an individual unit. Such an example is depicted in FIG. 8, which is a block diagram of a reserve fuel system 800 including a bladder 820 for multiple wellsite equipment according to one example of the present disclosure. Like the reserve fuel system 700 of FIG. 7, the reserve fuel system 800 may include a fuel supply inlet 802 supplying gaseous fuel to an engine fuel inlet 814 via a fuel supply line 804 as well as to a tank 806. The tank 806 can be coupled to the fuel supply line 804 via a first valve 808 that can control gaseous fuel flow into the tank 806. The tank 806 can also be coupled to the fuel supply line 804 or to the engine fuel inlet 814 by a second valve 810 that can control gaseous fuel flow out of the tank 806. The reserve fuel system 800 further includes a control system 815 that can control an actuation of the second valve 810 and, optionally, a bladder 820 inside the tank 806. The bladder 820 may expand in volume to increase a pressure inside of the tank 805. This increased pressure may aid transfer of gaseous fuel out of the tank 806 to the engines 812*a-c*. For example, a compressor 818 on the outside of the tank 806 may cause the bladder 820 to expand. In another example, external air may be pumped in from outside of the tank 806 to increase a volume of the bladder 820.

The reserve fuel system 800 may include a relatively large (e.g., larger than the tank 706 for a single engine 712 depicted in FIG. 7) tank 806 mounted to a trailer or skid. The tank 806 can provide reserve fuel for multiple engines 812*a-c* in the event of fluctuations in gaseous fuel pressure, flow, fuel quality, or energy. The tank 806 may be plumbed in parallel with the fuel supply line 804 supplying gaseous fuel to the multiple engines 812*a-c* at a wellsite. The engines 812*a-c* may be arranged in a fuel daisy chain 816, as depicted in FIG. 8. In other examples, the engines 812*a-c* may be arranged at a distribution station at the wellsite that connects multiple units. In either example, the control system 815 may actuate the second valve 810 for the tank 806 based on detected pressure of the fuel supply line 804 to supply the multiple engines 812*a-c* with reserved gaseous fuel.

Figure 9:
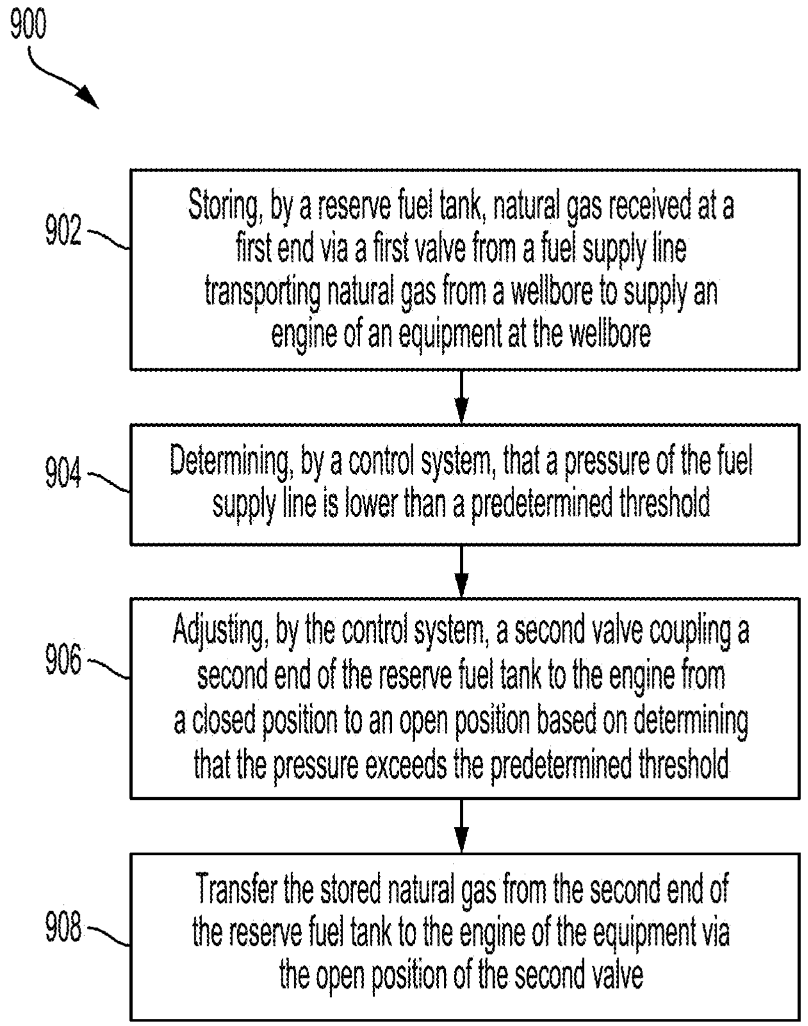
FIG. 9 is a flowchart of a process for using a reserve fuel system for wellsite equipment according to one example of the present disclosure.

FIG. 9 is a flowchart of a process for using a reserve fuel system for wellsite equipment according to one example of the present disclosure. While FIG. 9 depicts a certain sequence of steps for illustrative purposes, other examples can involve more steps, fewer steps, different steps, or a different order of steps depicted in FIG. 9. The process 900 is described with reference to components shown in FIGS. 1-3.

At block 902, a reserve fuel tank 306 can store gaseous fuel received at a first end via a first valve 308 from a fuel supply line 304 transporting gaseous fuel from a wellbore 108 to supply an engine 312 of an equipment 201 at the wellbore 108. In some examples, the first valve 308 may be a check valve. The first valve 308 may prevent gaseous fuel stored in the tank 306 from transferring back into the fuel supply line 304 via the first end of the tank 306. That is, gaseous fuel may flow into the tank 306 via the first valve 308 but gaseous fuel may not flow out of the tank 306 via the first valve 308. Diverted gaseous fuel may automatically fill the tank 306 once a fuel supply is attached to the tank 306.

At block 904, a control system 315 can determine that a pressure of the fuel supply line 304 is lower than a predetermined threshold. The pressure of the fuel supply line 304 may fluctuate based on the supply of gaseous fuel from the wellbore 108. For example, gaseous fuel production from a wellbore 108 may decrease over time until the wellbore 108 no longer produces gaseous fuel. Or, the supply of gaseous fuel from the wellbore 108 may be inconsistent. If the supply of gaseous fuel is relatively low, the pressure of the fuel supply line 304 may be below the predetermined threshold. This can indicate that the engine 312 may be unable to operate efficiently when solely using gaseous fuel from the fuel supply line 304.

At block 906, the control system 315 can adjust a second valve 310 coupling a second end of the reserve fuel tank 306 to the engine 312 from a closed position to an open position based on determining that the pressure exceeds the predetermined threshold. The second valve 310 may be an actuator valve that can actuate between the closed position and the open position. In the closed position, the second valve 310 can prevent gaseous fuel stored in the tank 306 from being transferred out of the tank via the second end. In the open position, the second valve 310 can allow gaseous fuel stored in the tank 306 to transfer out of the tank 306 and to the engine 312 via the second end. The actuation of the second valve 310 can be controlled by the control system 315.

At block 908, the stored gaseous fuel can be transferred from the second end of the reserve fuel tank 306 to the engine 312 of the equipment via the open position of the second valve 310. The second valve 310 may be in the open position until the tank 306 is empty or until the control system 315 actuates the second valve 310 back to the closed position. The control system 315 may adjust the second valve 310 to the closed position in response to detecting that the pressure of the fuel supply line 304 is above the predetermined threshold. That is, the supply of gaseous fuel may have stabilized and the engine 312 may no longer need a supplemented fuel supply to operate efficiently.

In some aspects, a system, method, and reserve fuel tank for wellsite equipment are provided according to one or more of the following examples:

Example 1 is a system comprising: a fuel supply line configurable to transport gaseous fuel at a wellsite; an engine of an equipment coupled to the fuel supply line, the engine configurable to perform a wellsite operation at the wellsite using gaseous fuel received from the fuel supply line; and a reserve fuel tank configurable to store gaseous fuel diverted from the fuel supply line, the reserve fuel tank comprising: a first valve configurable to couple a first end of the reserve fuel tank to the fuel supply line to divert gaseous fuel from the fuel supply line into the reserve fuel tank; and a second valve configurable to couple a second end of the reserve fuel tank to the engine, the second valve being positionable in (i) a closed position to prevent the stored gaseous fuel in the reserve fuel tank from transferring to the engine and (ii) an open position to transfer the stored gaseous fuel from the reserve fuel tank to the engine.

Example 2 is the system of example(s) 1, further comprising: a control system configurable to adjust the second valve from the closed position to the open position in response to detecting that a pressure of the fuel supply line is lower than a predetermined threshold, and wherein the control system is further configurable to adjust the second valve from the open position to the closed position in response to detecting that the pressure of the fuel supply line is above the predetermined threshold.

Example 3 is the system of example(s) 1-2, further comprising: a compressor coupled to (i) the fuel supply line upstream from the reserve fuel tank and (ii) the first end of the reserve fuel tank, the compressor being configurable to compress gaseous fuel received from the fuel supply line to increase a pressure of gaseous fuel stored in the reserve fuel tank.

Example 4 is the system of example(s) 1-3, wherein the reserve fuel tank further comprises: a bladder positionable within the reserve fuel tank; and a compressor configurable to expand a volume of the bladder to increase a pressure of gaseous fuel stored in the reserve fuel tank.

Example 5 is the system of example(s) 1-4, wherein the engine of the equipment is a first engine of a first equipment, and wherein the reserve fuel tank is further configurable to transfer stored gaseous fuel to a second engine of a second equipment at the wellsite.

Example 6 is the system of example(s) 1-5, wherein the first valve is configurable to prevent gaseous fuel stored in the reserve fuel tank from transferring into the fuel supply line via the first end of the reserve fuel tank.

Example 7 is the system of example(s) 1-6, wherein the first valve is a check valve, and wherein the second valve is an actuator valve.

Example 8 is a method comprising: storing, by a reserve fuel tank, gaseous fuel received at a first end via a first valve from a fuel supply line transporting gaseous fuel at a wellsite to supply an engine of an equipment at the wellsite; adjusting a second valve coupling a second end of the reserve fuel tank to the engine from a closed position to an open position; and transferring the stored gaseous fuel from the second end of the reserve fuel tank to the engine of the equipment via the open position of the second valve.

Example 9 is the method of example(s) 8, further comprising: determining, by the control system, that a pressure of the fuel supply line is lower than a predetermined threshold; and adjusting, by the control system, the second valve to the open position based on determining that the pressure of the fuel supply line is lower than the predetermined threshold.

Example 10 is the method of example(s) 8-9, further comprising: determining, by the control system, that the pressure of the fuel supply line to is above the predetermined threshold; and adjusting, by the control system, the second valve from the open position to the closed position based on determining that the pressure of the fuel supply line is above the predetermined threshold.

Example 11 is the method of example(s) 8-10, further comprising: compressing, by a compressor coupled to the fuel supply line upstream from the reserve fuel tank, gaseous fuel received from the fuel supply line and supplied to the first end of the reserve fuel tank to increase a pressure of gaseous fuel stored in the reserve fuel tank; and transferring gaseous fuel stored in the reserve fuel tank to the engine based on the increased pressure caused by the compressor.

Example 12 is the method of example(s) 8-11, further comprising: expanding, by a compressor coupled to a bladder positioned inside the reserve fuel tank, a volume of the bladder to increase a pressure of gaseous fuel stored in the reserve fuel tank; and transferring gaseous fuel stored in the reserve fuel tank to the engine based on the increased pressure caused by the bladder.

Example 13 is the method of example(s) 8-12, further comprising: preventing, by the first valve, gaseous fuel stored in the reserve fuel tank from transferring into the fuel supply line via the first end of the reserve fuel tank.

Example 14 is the method of example(s) 8-13, wherein the first valve is a check valve, and wherein the second valve is an actuator valve.

Example 15 is a reserve fuel tank comprising: a tank configurable to store gaseous fuel diverted from a fuel supply line that is configurable to transport the gaseous fuel at a wellsite to an engine of an equipment configurable to perform a wellsite operation at the wellsite; a first valve configurable to couple a first end of the tank to the fuel supply line to divert gaseous fuel from the fuel supply line into the tank; and a second valve configurable to couple a second end of the reserve fuel tank to the engine, the second valve being positionable in (i) a closed position to prevent the gaseous fuel stored in the reserve fuel tank from transferring to the engine and (ii) an open position to transfer the gaseous fuel stored in the reserve fuel tank to the engine.

Example 16 is the reserve fuel tank of example(s) 15, further comprising: a control system configurable to adjust the second valve from the closed position to the open position in response to detecting that a pressure of the fuel supply line is lower than a predetermined threshold, wherein the control system is further configurable to adjust the second valve from the open position to the closed position in response to detecting that the pressure of the fuel supply line is above the predetermined threshold.

Example 17 is the reserve fuel tank of example(s) 15-16, wherein the first end of the reserve fuel tank is couplable to a compressor, wherein the compressor is further couplable to the fuel supply line upstream from the reserve fuel tank, the compressor being configurable to compress gaseous fuel received from the fuel supply line to increase a pressure of gaseous fuel in the reserve fuel tank.

Example 18 is the reserve fuel tank of example(s) 15-17, further comprising: a bladder positionable within the reserve fuel tank; and a compressor configurable to expand a volume of the bladder to increase a pressure of gaseous fuel stored in the reserve fuel tank.

Example 19 is the reserve fuel tank of example(s) 15-18, wherein the engine of the equipment is a first engine of a first equipment, and wherein the reserve fuel tank is further configurable to transfer stored gaseous fuel to a second engine of a second equipment at the wellsite.

Example 20 is the reserve fuel tank of example(s) 15-19, wherein the first valve is configurable to prevent gaseous fuel stored in the reserve fuel tank from transferring into the fuel supply line via the first end of the reserve fuel tank.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a fuel supply line configurable to transport gaseous fuel at a wellsite;

an engine of an equipment coupled to the fuel supply line, the engine configurable to perform a wellsite operation at the wellsite using gaseous fuel received from the fuel supply line;

a reserve fuel tank configurable to store gaseous fuel diverted from the fuel supply line, the reserve fuel tank comprising:

a first valve configurable to couple a first end of the reserve fuel tank to the fuel supply line to divert gaseous fuel from the fuel supply line into the reserve fuel tank; and a second valve configurable to couple a second end of the reserve fuel tank to the engine, the second valve being positionable in (i) a closed position to prevent the stored gaseous fuel in the reserve fuel tank from transferring to the engine and (ii) an open position to transfer the stored gaseous fuel from the reserve fuel tank to the engine; and a control system configurable to adjust the second valve from the closed position to the open position in response to detecting that a pressure of the fuel supply line is lower than a predetermined threshold, and wherein the control system is further configurable to adjust the second valve from the open position to the closed position in response to detecting that the pressure of the fuel supply line is above the predetermined threshold.

2. The system of claim 1, further comprising:

a compressor coupled to (i) the fuel supply line upstream from the reserve fuel tank and (ii) the first end of the reserve fuel tank, the compressor being configurable to compress gaseous fuel received from the fuel supply line to increase a pressure of gaseous fuel stored in the reserve fuel tank.

3. The system of claim 1, wherein the reserve fuel tank further comprises:

a bladder positionable within the reserve fuel tank; and a compressor configurable to expand a volume of the bladder to increase a pressure of gaseous fuel stored in the reserve fuel tank.

4. The system of claim 1, wherein the engine of the equipment is a first engine of a first equipment, and wherein the reserve fuel tank is further configurable to transfer stored gaseous fuel to a second engine of a second equipment at the wellsite.

5. The system of claim 1, wherein the first valve is configurable to prevent gaseous fuel stored in the reserve fuel tank from transferring into the fuel supply line via the first end of the reserve fuel tank.

6. The system of claim 1, wherein the first valve is a check valve, and wherein the second valve is an actuator valve.

7. A method comprising:

storing, by a reserve fuel tank, gaseous fuel received at a first end via a first valve from a fuel supply line transporting gaseous fuel at a wellsite to supply an engine of an equipment at the wellsite;

adjusting a second valve coupling a second end of the reserve fuel tank to the engine from a closed position to an open position;

transferring the stored gaseous fuel from the second end of the reserve fuel tank to the engine of the equipment via the open position of the second valve;

determining, by a control system, that a pressure of the fuel supply line is lower than a predetermined threshold; and adjusting, by the control system, the second valve to the open position based on determining that the pressure of the fuel supply line is lower than the predetermined threshold.

8. The method of claim 7, further comprising:

determining, by the control system, that the pressure of the fuel supply line to is above the predetermined threshold; and adjusting, by the control system, the second valve from the open position to the closed position based on determining that the pressure of the fuel supply line is above the predetermined threshold.

9. The method of claim 7, further comprising:

compressing, by a compressor coupled to the fuel supply line upstream from the reserve fuel tank, gaseous fuel received from the fuel supply line and supplied to the first end of the reserve fuel tank to increase a pressure of gaseous fuel stored in the reserve fuel tank; and transferring gaseous fuel stored in the reserve fuel tank to the engine based on the increased pressure caused by the compressor.

10. The method of claim 7, further comprising:

expanding, by a compressor coupled to a bladder positioned inside the reserve fuel tank, a volume of the bladder to increase a pressure of gaseous fuel stored in the reserve fuel tank; and transferring gaseous fuel stored in the reserve fuel tank to the engine based on the increased pressure caused by the bladder.

11. The method of claim 7, further comprising:

preventing, by the first valve, gaseous fuel stored in the reserve fuel tank from transferring into the fuel supply line via the first end of the reserve fuel tank.

12. The method of claim 7, wherein the first valve is a check valve, and wherein the second valve is an actuator valve.

13. A reserve fuel tank comprising:

a tank configurable to store gaseous fuel diverted from a fuel supply line that is configurable to transport the gaseous fuel at a wellsite to an engine of an equipment configurable to perform a wellsite operation at the wellsite;

a first valve configurable to couple a first end of the tank to the fuel supply line to divert gaseous fuel from the fuel supply line into the tank;

a second valve configurable to couple a second end of the reserve fuel tank to the engine, the second valve being positionable in (i) a closed position to prevent the gaseous fuel stored in the reserve fuel tank from transferring to the engine and (ii) an open position to transfer the gaseous fuel stored in the reserve fuel tank to the engine; and a control system configurable to adjust the second valve from the closed position to the open position in response to detecting that a pressure of the fuel supply line is lower than a predetermined threshold, wherein the control system is further configurable to adjust the second valve from the open position to the closed position in response to detecting that the pressure of the fuel supply line is above the predetermined threshold.

14. The reserve fuel tank of claim 13, wherein the first end of the reserve fuel tank is couplable to a compressor, wherein the compressor is further couplable to the fuel supply line upstream from the reserve fuel tank, the compressor being configurable to compress gaseous fuel received from the fuel supply line to increase a pressure of gaseous fuel in the reserve fuel tank.

15. The reserve fuel tank of claim 13, further comprising:

a bladder positionable within the reserve fuel tank; and a compressor configurable to expand a volume of the bladder to increase a pressure of gaseous fuel stored in the reserve fuel tank.

16. The reserve fuel tank of claim 13, wherein the engine of the equipment is a first engine of a first equipment, and wherein the reserve fuel tank is further configurable to transfer stored gaseous fuel to a second engine of a second equipment at the wellsite.

17. The reserve fuel tank of claim 13, wherein the first valve is configurable to prevent gaseous fuel stored in the reserve fuel tank from transferring into the fuel supply line via the first end of the reserve fuel tank.

* * * * *